United States Patent

[11] 3,625,934

| [72] | Inventor | Jacobus Rinse<br>P.O. Box 248, Bernardsville, N.J. 07924 |
|---|---|---|
| [21] | Appl. No. | 741,899 |
| [22] | Filed | July 2, 1968 |
| [45] | Patented | Dec. 7, 1971 |

[54] OLIGOMERS OF MIXED TETRAVALENT ELEMENT OXIDES
9 Claims, No Drawings

[52] U.S. Cl..................................................... 260/97.5,
117/161, 260/429.3, 260/429.5, 260/46.5
[51] Int. Cl...................................................... C09f 1/04
[50] Field of Search........................................... 260/97.5,
429.3, 429.7, 429.5; 117/161

[56] References Cited
UNITED STATES PATENTS
3,054,816  9/1962  Rinse............................ 260/429.3
3,458,552  7/1969  Hauck et al................... 260/429.5

FOREIGN PATENTS
825,878  12/1959  Great Britain................ 260/414
972,804  10/1964  Great Britain................

OTHER REFERENCES
Rinse; J. Industrial & Engineering Chemistry, 1964 Vol. 56 (pp. 42 to 50 relied on).

Primary Examiner—Hosea E. Taylor
Assistant Examiner—William E. Parker
Attorney—Littlepage, Quaintance & Wray ABSTRACT: Oligomers of silicon and a tetravalent metal wherein each tetravalent metal atom is bound to a silicon atom through an oxygen bridge are useful as protective coatings and as intermediates for paint driers and plastic stabilizers.

OLIGOMERS OF MIXED TETRAVALENT ELEMENT OXIDES

BACKGROUND

Organometallic compounds have been the subject of considerable interest for a number of years. Increasing the metal content of such compounds by the formation of oligomers wherein metal atoms are bound to like or different metal atoms through oxygen bridges have been effected for a trivalent metal (USP 2,979,497), tetravalent metals (USP 2,980,719, USP 3,087,949 and USP 3,385,835) and combinations of divalent with tri- and tetravalent metals (British Pat. No. 972,804 and Rinse, J., "Metal Soaps," *American Paint Journal*, March 13, 1967). In addition space tetramers and octamers of silicon are reported in USP 3,177,238 and USP 3,243,477, and organometallic compounds having a divalent metal and a tetravalent element (metal or nonmetal) are described in British Pat. No. 1,010,074.

The speed of hydrolysis of metal alcoholates is considerably greater than that of silicon alkoxides (also called silicon esters). Although strong acids promote the hydrolysis of silicon esters, they may remain exposed to the atmosphere for several days without noticeable change.

SUMMARY

Condensates of esters of silicon with alkoxides of titanium, zirconium or tin are cyclic or linear compounds with alternating silicon and metal atoms: —SiOMOSiOMO—. The condensation proceeds at room temperature (20° C.) and more rapidly at higher temperatures. The condensates are liquids (referred to as oligomers) having a greatly reduced rate of hydrolysis compared with that of the starting metal alkoxide. Condensates of similar structures are prepared in the same manner from two different tetravalent metals selected from those cited.

The alkoxy groups which remain on the metal atoms may be replaced by fatty acids without reacting the fatty acids with the alkoxy groups bonded to the silicon atoms. The resulting products are extremely stable and are useful as heat- and water-resistant coatings. They are further useful for the modification of metal acylates and metal oxide acylates, particularly if the latter contain acetate or formate groups. This reaction proceeds at 150° C. or higher by ester formation according to the following reaction scheme:

—M″—O—CO—R″+R′—O—M⇇→
                        —M″—O—M⇇+R″—CO—O—R′ wherein
M″ is a divalent or a trivalent metal,
M is tetravalent titanium, tin or zirconium;
R′ is alkyl, preferably lower alkyl having at most seven carbon atoms, e.g., methyl, ethyl and isopropyl; and
R″ is either a hydrogen atom or lower alkyl, preferably hydrogen
or methyl.

The resulting condensation products are characterized by low viscosity and good solubility in hydrocarbons. These condensates make it possible, e.g., to prepare liquid lead tallate with 36 percent by weight of lead, liquid zinc oleate with 15 percent by weight of zinc and zinc-iron-oxide-tallate with 14 percent by weight of zinc and 6 percent by weight of iron. Antimony and bismuth acylates react with the metal/silicate condensates, e.g. tetramers, to yield liquids which are useful as catalysts.

The weight ratio of the metal/silicate condensate to metal acylate or metal oxide acylate varies over a broad range, e.g. from 5 to 50 percent, but ordinarily from 10 to 25 percent, inclusive.

It is an object of the instant invention to provide liquid metal oxide alkoxide oligomers of either two different tetravalent metals or a tetravalent metal and silicon and in which the tetravalent metals either alternate with each other or with silicon in a structure wherein each tetravalent metal atom is bonded to another tetravalent metal atom or to a silicon only through an oxygen bridge. A further object is to prepare linear or cyclic nonspatial oligomers having a high weight percent of tetravalent metal and/or one or more other metals. Another object is to produce a metal alcoholate condensate having a reduced rate of hydrolysis. A still further object is to prepare oligomers suitable for use as heat-resistant and water-resistant coatings. Additional objects include the preparation of intermediates which are condensated, e.g., with di- and trivalent metal oxide acylates in the preparation of stains, protective coatings, catalysts, stabilizers and preservatives. Other objects are apparent from the disclosure which follows:

DETAILS

Mixtures of tetravalent metal alcoholate and condensed silicon ester produce a heat effect and liquid condensates having increased boiling points and a lower rate of hydrolysis. Similar condensates are prepared in essentially the same manner by replacing the tetravalent metal alcoholate with a condensed tetravalent metal alcoholate and/or the condensed silicon ester with a noncondensed (regular) silicon ester, preferably at an elevated temperature, e.g. from 50° to 120° C. Also corresponding condensates are prepared in similar fashion from alcoholates of two different tetravalent metals, but the combination of silicon with a tetravalent metal is preferred.

Based on the particular form of the metal alcoholate, the silicon ester and the reaction temperature, compounds (primarily trimers and tetramers) are formed which are either linear or cyclic. The tetravalent metal is preferably either titanium, tin or zirconium or a combination of said metals. The condensates thus vary in structure and vary with respect to the tetravalent metal(s) and the organic ligands (alkoxy groups or, alternatively, when bound to a tetravalent metal atom, an acyloxy group). The compounds within the scope of this invention are, e.g., of the formulas:

(RO)₃—M′—O—M(OR)₂—O—M′(OR)₃     I (RO)₃—M′—O—M(OR)₂—O—M′(OR)₂—O—M(OR)₂—O—M′(OR)₃     II

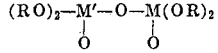
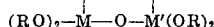
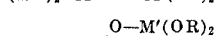
    III

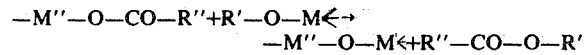     IV

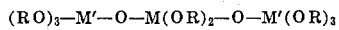
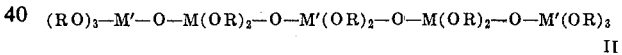

     VI

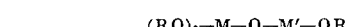
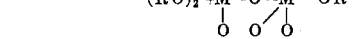
     VII

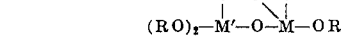
     VIII wherein

M is tetravalent titanium, tin or zirconium;

M' is different from M and is either tetravalent titanium, tin, zirconium or, preferably, silicon;

R is either alkyl, phenyl or, when not bonded through an oxygen bridge to a silicon atom, carboxylic acid acyl;

and in each silicon-containing compound of which there is at least one atom of silicon per atom of tetravalent metal. The compounds are primarily trimers, e.g. I and IV, and tetramers, e.g. III, and may be either linear, e.g. II, or cyclic, e.g. IV and VII.

Although each M, M' and R is independent of the others, both M and M' ordinarily stand for their same respective elements in any given compound. Each R bonded through an oxygen bridge to the same tetravalent element ordinarily has the same meaning.

When R is alkyl, it is preferably lower alkyl and, more particularly, either methyl, ethyl, isopropyl or butyl. When R is acyl, it is preferably aliphatic acyl having a carbon-to-carbon chain of from seven to 22 carbon atoms, e.g. n-heptylyl, lauryl, palmityl, stearyl, oleyl, linoleyl, linolenyl and behenyl, but may be lower acyl of less than seven carbons, e.g. acetyl, isopropionyl and butyryl.

By keeping the atomic ratio of M:Si (in the condensation) to 1:1 or lower, no free metal alcoholate is obtained, provided the degree of condensation of the silicon ester is adequate. A commercial condensed silicon ester, ethylsilicate 40, comprising chains of five silicon atoms linked by oxygen bridges and 12 ethoxy groups, is suitable. Highly condensed, but still soluble (in, e.g., hydrocarbons, such as mineral spirits and zylene, and alcohols, such as ethanol), silicon-oxide-esters of the formula $(RO)_4Si_4O_6$ also react readily with tetravalent metal alcoholates. In fact, even noncondensed silicon esters can be similarly employed to obtain contemplated oligomers.

Instead of preferred condensed ethylsilicate, partially hydrolyzed mixtures of uncondensed alkoxides, i.e. $M(OR)_4$ and $Si(OR)_4$, can be condensed. A mixture of condensed metal alcoholate and ortho ethyl silicate may be condensed, or a mixture of condensed metal alcoholate and condensed $Si(OR)_4$ may be further condensed. The latter may require heat for rearrangement. In view of the low cost of condensed ethylsilicate, it is a choice starting material. Alkoxides of titanium, zirconium and tin (and mixtures thereof) readily react with condensed silicon ester.

The resulting condensates are oligomers which, on exposure to humid air, convert into solid transparent films. The specific properties of the protective coating provided by such film depend on the ratio of metal-to-silicon, the degree of condensation and the particular ligands, i.e. phenoxy or the particular alkoxy.

These oligomers, which are silicon/metal alkoxides, readily react at temperatures below 150° C. with fatty (monocarboxylic) acids to replace metal-bound alkoxy groups with acyloxy groups. (Only sufficient acid is employed to replace the metal-bound alkoxy groups, which are preferentially replaced.) When unsaturated fatty acids are used, an air-drying varnish with good heat resistance is obtained; stearic acid produces a water repellent for textiles and masonry. The acylated products can be considered as oils or waxes in which the glyceride radical is replaced by silicon-metal oxide groupings. They are useful for applications of the more expensive silicones.

All of the primary compounds of this invention have in their molecular structures from three to eight tetravalent atoms (other then carbon in organic ligands) each of which is bound to at least one tetravalent atom of a different element through an oxygen bridge. In addition, each tetravalent atom can also be bound to another tetravalent atom of the same element through an oxygen bridge. All valencies of said tetravalent atoms which are not satisfied in one of those ways are bound either to alkoxy, phenoxy or acyloxy (organic) ligands, as previously defined and exemplified by formulas I to VII. Compounds having metal-bound alkoxy ligands are intermediates for those having metal-bound acyloxy ligands.

the tetravalent atoms in a given compound are ordinarily of only two different elements, at least one of which is a metal. In the preferred embodiments the other tetravalent element is silicon. Embodiments containing silicon have in their molecular structures at least one silicon atom for each atom of a tetravalent metal, preferably either titanium, tin or zirconium. Silicon is the only tetravalent nonmetal (other than carbon in the organic ligands) in any of said compounds.

Said primary compounds are liquids which are useful as protective coatings for solid substrates, e.g. wood. They are also useful as intermediates for paint driers, stains, catalysts, stabilizers and preservatives.

The metal-silicon alkoxides of this invention react with metal acylates, preferably formates or acetates, when a mixture thereof is heated above 150° C. At that temperature a second condensation reaction proceeds between the tetravalent metal alkoxide groupings and the metal acylate, causing liberation of volatile (or nonvolatile) ester, e.g. butyl acetate, and linking the metal acylate to the silicon-metal oligomer:

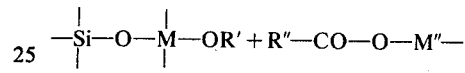

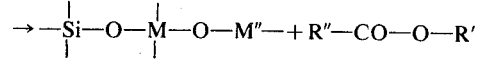

wherein M,M'', R' and R'' have aforestated meanings, as all variables have throughout the subject disclosure in the absence of a clear statement to the contrary.

The resulting metal-silicon-metal oligomers have much lower melting points than the metal acylates from which they are prepared. Only a limited amount of silicon-metal oligomer is needed, e.g. 5 to 50 (ordinarily from 10 to 25) percent by weight based on the weight of the metal acylate. This further condensation reaction is readily effected with divalent metal, e.g. lead, cobalt, manganese and zinc, and trivalent metal, e.g. aluminum iron and chromium, acylates, but an antimony acylate or bismuth acylate is preferred.

In addition to acylates of a single metal, bi- and trimetal acylates, such as those disclosed in copending U.S. application Ser. No. 651,120 filed July 5, 1967, may alternatively be employed to obtain products which are similarly useful.

These metal/silicon-metal condensates are liquids of greatly reduced viscosity and of high metal content. They are thus advantageously used as paint driers and as stabilizers for plastics.

All of the starting materials are either known or are prepared according to published procedures from available compounds.

Tetravalent metal alcoholates, e.g. titanium tetraalkoxides with three or four alkoxy groups per metal atom are very reactive, e.g. they hydrolyze rapidly. Silicon esters hydrolyze slowly, if at all. The subject —Si—O—M—O—Si— compounds react slowly, apparently by means of the remaining alkoxy ligands from the titanium alcoholate.

The primary condensates with only alkoxy ligands do not release volatile silicon or tetravalent metal, e.g. titanium, compounds when heated to 200° C., even in vacuum. They are all colorless liquids at room temperature and form clear continuous films, materially different from those of silicon esters and, e.g., those of titanium alkoxides. The former do not dry; the latter hydrolyze to a noncoherent white powder. Although the formed films are brittle, good flexibility thereof obtained by substituting carboxylic acid acyloxy groups (preferably those having at least seven carbon atoms) for the tetravalent-metal-bound alkoxy ligands. This is readily accomplished since carboxylic acids react selectively with the tetravalent-metal-bound alkoxy ligands.

The following examples are illustrative embodiments of the invention and are in no way limitative.

EXAMPLE 1

Mix 284 g. of titanium tetraisopropoxide (TPT) with 300 g. of condensed ethylsilicate 40 (containing 40 SiO$_2$). The temperature rises 20° C., and a clear, stable, colorless liquid, which does not form an insoluble skin or crust in the neck of the container results. This liquid is a compound of the formula:

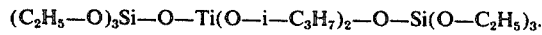

Replacing the TPT with 383 g. of zirconium butoxide or 411 g. of tin butoxide results in the preparation in the same manner of the corresponding zirconium or tin analogues.

EXAMPLE 2

Mix 284 g. of TPT with 250 g. of tetrameric silicon oxide butoxide [(C$_4$H$_9$—O)$_4$Si$_4$O$_6$] and promptly heat the resultant to 120° C. to obtain a clear liquid reaction product having a cyclic structure, such as:

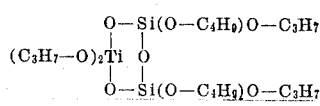

The clear liquid is a colorless condensate which dries in air to a smooth coating and has greater stability with respect to temperature and hydrolysis than the reactants from which it is prepared. The condensate is useful as primers for protective coatings or as adhesion coatings for solid substrates.

Heating to 50° C. results in a similar condensate.

Replacing the TPT with 383 g. of zirconium butoxide or 411 g. of tin butoxide results in the preparation in the same manner of the corresponding zirconium or tin anologues.

EXAMPLE 3

Mix 568 g. of TPT with 150 g. of condensed ethylsilicate and promptly heat the resultant to 100° C. There is thus obtained a liquid oligomer of titanium and silicon wherein each silicon atom is linked to a titanium atom through an oxygen bridge. The liquid oligomer has a lower rate of hydrolysis than TPT and is useful as a catalyst in the preparation of silicon oxide alkoxide oligomers.

EXAMPLE 4

Mix 568 g. of TPT with 150 g. of regular ortho-ethylsilicate. Drop water slowly into the admixture while heating same to a temperature of from 100° to 120° C. to obtain a condensate which is an oligomer of silicon and titanium wherein each atom of silicon is bonded to a titanium atom through an oxygen bridge.

EXAMPLE 5

Mix 182 g. of condensed TPT with 208 g. of ortho-ethylsilicate. Heat the resultant to a temperature of from 100° to 120° to obtain a condensate having a structure with alternating —SiO— and —TiO— groupings.

The condensed TPT is prepared by mixing water with TPT and heating the resultant at a temperature of from 100° to 120° C. according to the reaction scheme:

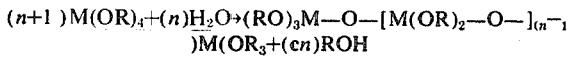

where
M is titanium,
R is isopropyl, and
$n$ is the number of moles of water reacted with $(n+1)$ moles of titanium alkoxide.

EXAMPLE 6

Heat a mixture of 145 g. of titanium oxide butoxide [(C$_4$H$_9$O)$_4$Ti$_4$O$_6$ prepared according to the disclosure of USP 3,087,949] and 206 g. of silicon tetraethoxide (b.p. 165° C.) to 50° to obtain a colorless liquid which can be heated to 200° C. without decomposition or distillation. The colorless liquid is comprised of compounds which are silicon/titanium oxide esters wherein silicon and titanium atoms are linked only through oxygen bridges. Cyclic oligomers, primarily tetrameric, predominate although some linear oligomer is present.

EXAMPLE 7

Admix 56.0 g. of tall oil fatty acid with 58.4 g. of the product of example 1, and distill off from the resultant a mixture of isopropanol and ethanol. The resulting condensate is a clear orange colored oil (105 g.) which (upon addition thereto of cobalt drier) forms a hard, heat-resisting film which is useful as a protective coating on a solid substrate.

Replacing said product of example 1 with 68.3 g. of the corresponding zirconium/silicon analogue, a lighter colored oil is obtained. Replacing said product of example 1 with 71.1 g. of the corresponding tin oxide silicate likewise results in an oil which is similarly useful.

EXAMPLE 8

Heat an admixture of 30 g. of antimony triacetate, 56 g. of tall oil fatty acid and 10 g. of mineral spirits to 200° C. Apply a vacuum to the resultant and allow the temperature to be lowered to 130° C, at which point add thereto 12 g. of the product of example 1 before raising the temperature to 170° C. Distill off ethyl and isopropyl acetates slowly. Apply a vacuum. There are thus obtained 77 g. of a clear light brown liquid which is useful as a catalyst for the preparation of urethane resins.

EXAMPLE 9

Heat a mixture of 30 g. of antimony triacetate and 56 g. of tall oil fatty acid to 210° C. and apply a vacuum to the resultant. After cooling same to 100° C., add thereto 12 g. of a mixture of equal parts by weight (pbw) of titanium isopropoxide (TPT) and condensed ethylsilicate before heating again to 190° C. There are thus obtained 78 g. of a liquid oil.

EXAMPLE 10

Reflux 25.3 g. of bismuth carbonate with 40 g. of acetic anhydride. Add thereto 36 g. of ethylhexoic acid, and raise the temperature of the resultant to 210° C. before applying a vacuum. Cool the reaction mixture to 100° C., and then add thereto 20 g. of the product of example 1. Raise the temperature to 130° C. for 10 minutes and then apply a vacuum. Distill off a mixture of ethanol and isopropanol. The residue is a clear brown liquid containing 26.5 percent by weight of bismuth.

EXAMPLE 11

Heat a mixture of 40.6 g. of bismuth triacetate and 56 g. of tall oil fatty acid to 210° C. and apply a vacuum to the resultant. After cooling same to 100° C., add thereto 12 g. of a mixture of equal pbw of titanium isopropoxide and condensed ethylsilicate before heating again to 190° C. A dark colored liquid is thus obtained.

EXAMPLE 12

Dissolve 20 g. of zinc oxide in a mixture of 43 g. of ethylhexoic acid and 6 g. of acetic acid. Heat the resulting admixture to 220° C. and apply a vacuum thereof. Heat to 150° C. before adding thereto 20 g. of the product of example 1. Thereafter, further heat to a temperature of 170° to 180° C. for 40 minutes and again apply a vacuum to obtain 74 g. of a viscous liquid containing 21.6 percent zinc.

EXAMPLE 13

Heat a mixture of 28.6 g. of basic ferric acetate, 24.3 g. of zinc oxide and 84 g. of tall oil fatty acid to 200° C. and, after subjecting the resultant to a vacuum, add thereto 30 g. of the silicon titanate product of example 1. Thereafter apply a vacuum again to obtain 140 g. of a clear dark brown liquid which is useful as a preservative stain for lumber.

Replacing the product of example 1 with an equivalent of each of the products of examples 2 through 6 results in the preparation in similar manner of a liquid which is likewise useful as a preservative for lumber.

EXAMPLE 14

Heat usefuh g. of zinc acetate tallate with 5 g. of tin-titanate alkoxide to 180° C. and maintain at said temperature until ester development terminates. There are thus obtained 23 g. of a clear liquid oil which is useful as a lumber preservative.

The tin titanate alkoxide is prepared according to the method of example 2 by replacing the silicon butoxide wit an equivalent of tin butoxide.

Replacing the tin tinanate alkoxide with an equivalent of any of the zirconium, titanium or tin analogues prepared according to examples 1 and 2 results in the preparation in similar manner of a corresponding liquid lumber preservative.

EXAMPLE 15

Dissolve 25.5 g. of barium acetate in 40 g. of water at 100° C., and add 74 g. of ethylhexoic acid to the resulting solution before heating same to 200° C. At the latter temperature add 12.6 g. of bismuth carbonate and maintain for 30 minutes, whereupon the resulting batch becomes clear. Apply a vacuum and cool to 110° C. before adding thereto 30 g. of the product of example 1. Thereafter heat to 130° C. and apply a vacuum to remove liberated alcohols. There are thus obtained 117 g. of a viscous clear oil which is useful as a stabilizer for plastics, e.g. vinyls, against heat.

Replacing the product of example 1 with an equivalent of either the zirconium or the tin analogue thereof results in the preparation in similar manner of liquids which are useful for the same purpose.

The invention and its advantages are apparent from the preceding description. Various changes maybe made in the processes and products without departing from the spirit or scope of the invention or sacrificing its material advantages.

What is claimed is:

1. A liquid oligomer of an oxide of each of at least two different tetravalent elements at least one of which is a tetravalent metal selected from the group consisting of titanium and tin and one of which is silicon, each of the tetravalent elements being bonded to at least one tetravalent element which is different therefrom, all bonds between said tetravalent elements being through oxygen bridges, all valences of the silicon not satisfied by said bonds being satisfied by a lower alkoxy ligand and all valencies of said metal not satisfied by said bonds being satisfied by an acyloxy ligano of seven to 22 carbon atoms.

2. An oligomer according to claim 1 wherein each acyloxy ligand has from seven to 22 carbon atoms and is saturated.

3. An oligomer according to claim 1 wherein each acyloxy ligand has from seven to 22 carbon atoms and is unsaturated.

4. A condensate of
   1. a liquid oligomer of an oxide of each of at least two different tetravalent elements at least one of which is a tetravalent metal selected from the group consisting of titanium and tin and at most one of which is silicon, each of the tetravalent elements being bonded to at least one tetravalent element which is different therefrom, all bonds between said tetravalent elements being through oxygen bridges, all valencies of said tetravalent metal and silicon not satisfied by said bonds being satisfied by a lower alkoxy ligand with with
   2. a metal acylate wherein the metal is selected from the group consisting of antimony, bismuth, aluminum, ferric iron, chromium, lead, cobalt, manganese, and zinc.

5. a condensate according to claim 4 wherein said metal is bismuth.

6. A condensate according to claim 4 wherein said metal is antimony.

7. A condensate according to claim 4 wherein the condensed oligomer comprises from 5 to 50 percent by weight based on the weight of the metal acylate.

8. A zinc acetate tallate/tin-tilanate alkoxide condensate according to claim 4.

9. The condensate of claim 4, wherein the acylate of the metal acyl is a lower molecular acyloxy ligand.

* * * * *